US011891291B2

(12) United States Patent
Gruson

(10) Patent No.: US 11,891,291 B2
(45) Date of Patent: Feb. 6, 2024

(54) FILLING SPOUT HAVING A RETURN LINE

(71) Applicant: Serac group, La Ferte Bernard (FR)

(72) Inventor: Bertrand Gruson, Breville sur Mer (FR)

(73) Assignee: SERAC GROUP, La Ferte Bernard (FR)

( * ) Notice: Subject to any disclaimer, the term of this patent is extended or adjusted under 35 U.S.C. 154(b) by 0 days.

(21) Appl. No.: 17/776,392

(22) PCT Filed: Dec. 14, 2020

(86) PCT No.: PCT/EP2020/085937
§ 371 (c)(1),
(2) Date: May 12, 2022

(87) PCT Pub. No.: WO2021/122433
PCT Pub. Date: Jun. 24, 2021

(65) Prior Publication Data

US 2022/0396464 A1 Dec. 15, 2022

(30) Foreign Application Priority Data

Dec. 16, 2019 (FR) ...................................... 1914527

(51) Int. Cl.
*B67C 3/28* (2006.01)
*B67C 3/00* (2006.01)
*B67C 7/00* (2006.01)

(52) U.S. Cl.
CPC ................ *B67C 3/28* (2013.01); *B67C 3/001* (2013.01); *B67C 2007/006* (2013.01)

(58) Field of Classification Search
CPC .. B67C 3/02; B67C 3/001; B67C 3/22; B67C 3/26; B67C 3/28; B67C 7/00; B67C 2007/006
See application file for complete search history.

(56) References Cited

U.S. PATENT DOCUMENTS 2,122,149 A * 6/1938 Lippold .................. B67C 3/246 141/50
2,263,551 A * 11/1941 Armstrong ................ B67C 3/02 141/46
5,313,990 A * 5/1994 Clusserath ............ B67C 3/2622 141/147
5,865,225 A * 2/1999 Weiss ...................... B67C 3/204 141/145

(Continued)

FOREIGN PATENT DOCUMENTS

DE 102007014702 A1 9/2008
DE 202019103782 U1 7/2019

*Primary Examiner* — Nicolas A Arnett
(74) *Attorney, Agent, or Firm* — Muncy, Geissler, Olds & Lowe, P.C.

(57) ABSTRACT

A packaging installation having at least one filler station includes a filler spout and a connection member connected firstly to a feed duct and secondly to a purge duct in order to connect these ducts to the spout. The connection member includes a spout supply pipe connected to the feed duct and a return pipe opening out into the spout and connected to the purge duct. The supply pipe and the return pipe are entirely independent of each other, such that the connection member acts continuously to connect in series the feed duct, the supply pipe, the spout, the return pipe, and the purge duct.

19 Claims, 4 Drawing Sheets

(56) References Cited

U.S. PATENT DOCUMENTS

| | | | | |
|---|---|---|---|---|
| 6,533,001 | B1 * | 3/2003 | Adriansens | B67C 3/28 141/145 |
| 7,942,170 | B2 * | 5/2011 | Gruson | B67C 3/045 141/237 |
| 8,535,037 | B2 * | 9/2013 | Voth | B29C 49/42 425/538 |
| 9,561,945 | B2 * | 2/2017 | Gruson | B67C 3/001 |
| 10,059,578 | B2 * | 8/2018 | Muszinski | B67C 3/28 |
| 11,014,797 | B2 * | 5/2021 | Hayakawa | A61L 2/18 |
| 11,078,063 | B2 * | 8/2021 | Drenguis | B08B 9/027 |
| 11,370,646 | B2 * | 6/2022 | Doblinger | B67C 3/045 |
| 2007/0113919 | A1 * | 5/2007 | Gruson | B67C 3/22 141/91 |
| 2010/0071802 | A1 * | 3/2010 | Clusserath | B65B 39/001 141/46 |
| 2013/0000779 | A1 * | 1/2013 | Gruson | B67C 3/22 141/115 |
| 2015/0266711 | A1 * | 9/2015 | Zoni | B67C 3/001 141/145 |
| 2022/0396464 | A1 * | 12/2022 | Gruson | B67C 3/22 |
| 2023/0025853 | A1 * | 1/2023 | Gruson | B65B 3/14 |

* cited by examiner

FILLING SPOUT HAVING A RETURN LINE

The present invention relates to a packaging installation for packaging a substance in containers.

BACKGROUND OF THE INVENTION

Installations for packaging a substance are known that comprise a series of filler stations, each having a filler spout and a support member for supporting a container under the filler spout in order to fill successive containers with a predetermined quantity of substance.

In those installations, the filler spout comprises a spout body having a top end that is connected to a feed duct and a bottom end that is provided with a controlled delivery valve.

When setting up the installation for packaging a new substance, it is necessary to begin by ensuring that the spout bodies are filled. Given the structure of the filler spouts, to do this, it is necessary to feed the filler spouts while keeping the bottom orifices open until the air initially contained in the ducts and the spout bodies has been completely purged therefrom, i.e. until the substance flowing out from the orifices does not contain any bubbles of air. The substance flowing out through the bottom orifice is collected by a collector adjacent to the orifices. In order to ensure that bubbles of air have not risen into the feed duct of the filler spout, it is necessary to allow the substance to flow for a relatively long length of time during which the installation is not in use for packaging the substance into containers.

Also, for space-saving reasons, the collector that is used for recovering the substance during initial filling of the filler spouts is generally also used for recovering the cleaning substance that is used for washing and/or rinsing the filler spouts, so it is not possible to envisage reusing the substance that flows out during the initial filling of the filler spout.

It therefore represents a loss, not only in terms of the cost of the unused substance, but also in terms of the additional cost of processing the substances that are recovered in the collector.

OBJECT OF THE INVENTION

An object of the invention is to propose an installation for reliably packaging a substance in containers, while minimizing the quantity of substance that is lost and while minimizing the amount of cleaning substance that is consumed while changing substance.

SUMMARY OF THE INVENTION

In order to achieve this object, the invention provides an installation for packaging a substance in containers, the installation including at least one filler station comprising a filler spout having a spout body with a bottom end provided with an orifice fitted with a controlled delivery valve, the installation further comprising a multichannel connection member connected firstly to a feed duct and secondly to a purge duct for connecting these ducts to the spout, the multichannel connection member comprising for this purpose both a filler spout supply pipe opening out into the spout body above the delivery valve and connected to the feed duct, and also a return pipe opening out into the spout body above the delivery valve and connected to the purge duct, the supply pipe and the return pipe being entirely independent of each other, such that the connection member acts continuously to connect in series the feed duct, the supply pipe, the spout, the return pipe, and the purge duct.

Thus, during initial filling or while changing substance, it suffices to send substance into the installation in a quantity that is only very slightly greater than the volume of the feed duct, of the pipes, and of the spout body in order to purge the feed duct, the pipes, the spout, and the connection member of the air or of the previous substance initially contained therein. This initial filling or change of substance can thus take place very quickly and the quantity of substance that is rejected is very small.

The absence of a filling vessel and of the associated pipework serves advantageously to limit the amount of washing water.

Optionally, the multichannel connection member includes:

- a first duct connected to the general feed duct and opening out into a first chamber to which the supply pipe of the filler spout is connected; and
- a second duct connected to the purge duct and opening out into a second chamber separate from the first chamber and having the return pipe of the filler spout connected thereto;

the second duct extending coaxially with the first duct.

Optionally, the second duct extends inside the first duct.

Optionally, the second chamber extends below the first chamber.

Optionally, the supply pipe extends parallel to the return pipe.

Optionally, at least one of the supply and return pipes extends in a straight line.

Optionally, the return pipe extends below the supply pipe.

Optionally, at least one of the supply and return pipes slopes between its high end connected to the multichannel connection member and its low end opening out into the spout.

Optionally, the installation includes a pump for admitting substance under pressure into the feed duct, the pump being controlled at least as a function of the quantity of substance present in the purge duct and of the delivery flow rate at the filler spouts.

Optionally, the installation has a plurality of filler stations with filler spout supply pipes and return pipes connected to the multichannel connection member.

Optionally, the filler spout supply pipes and the return pipes are regularly distributed around an axis of symmetry of the multichannel connection member.

Optionally, the installation includes at least one effluent outlet duct connected to the purge duct.

Optionally, the installation includes at least one feed vessel having a low portion connection to the feed duct and a high portion connection to the purge duct.

Optionally, the installation includes at least two feed vessels, at least three feed vessels, at least four feed vessels, at least five feed vessels, or at least six feed vessels, each having a respective low portion connection to the feed duct and a high portion connection to the purge duct.

Other characteristics and advantages of the invention appear on reading the following description of particular, nonlimiting embodiments of the invention.

BRIEF DESCRIPTION OF THE DRAWINGS

The invention can be better understood in the light of the following description given with reference to the accompanying figures, in which.

DETAILED DESCRIPTION OF THE INVENTION

Figure 1:
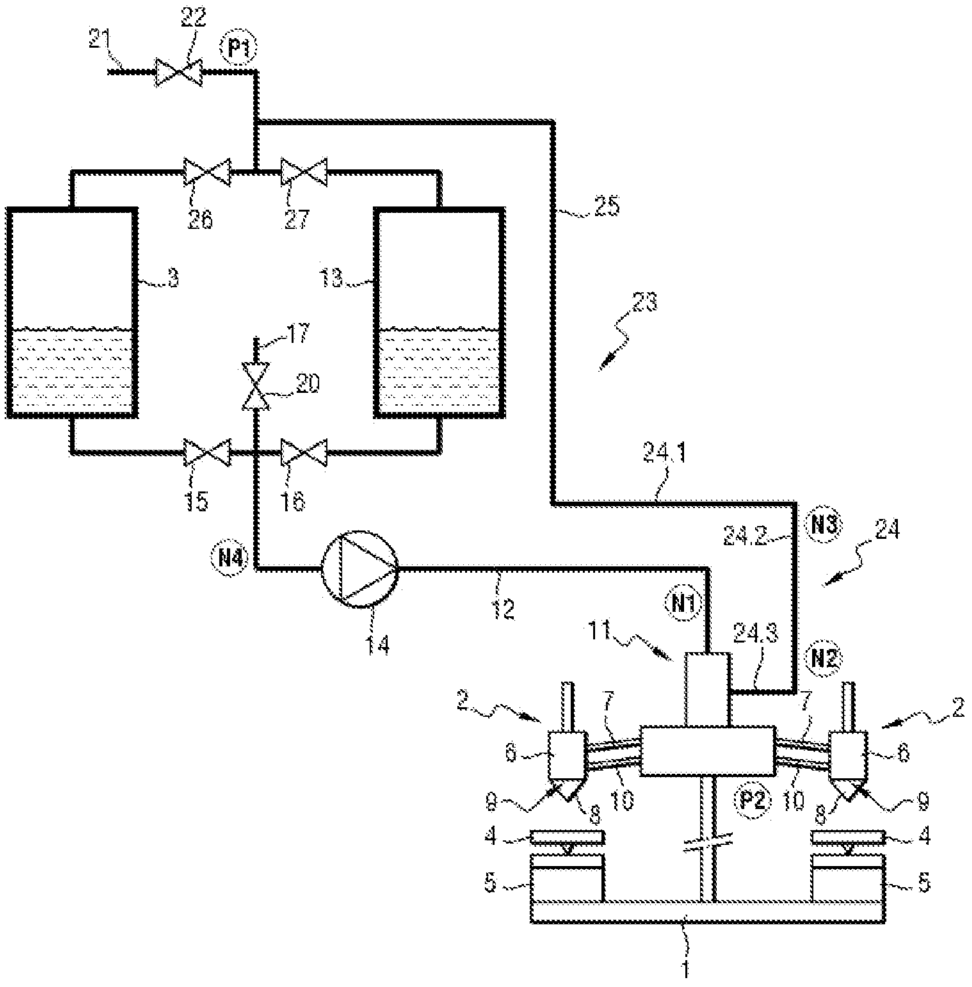
FIG. 1 is a diagrammatic overall view of a device in a first embodiment of the invention.

With reference to FIG. 1, the filler installation shown comprises in conventional manner a rotary carousel having a rotary structure 1 with filler stations mounted thereon, each having a filler spout 2 and a support member 4 for supporting a container under the filler spout, each support member 4 being associated with a weighing member 5 for acting in association with a control unit (not shown) for controlling the corresponding filler spout 2. Each filler spout 2 is thus vertically above a given container without being in contact therewith. Each filler spout 2 is offset from the associated container.

Each filler spout 2 has a spout body 6 with a top end connected to a supply pipe 7 for supplying the filler spout 2, and a bottom end provided with an orifice 8 fitted with a controlled delivery valve 9.

Each filler spout 2 is also fitted with a return pipe 10 having one end fastened to the spout body 6 and opening out into the spout body 6 above the delivery valve 9 and below the zone where the supply pipe 7 opens out into the spout body 6, and an opposite end connected to a multichannel connection member 11, or "manifold", of structure that is described below with reference to FIG. 2.

Each filler spout 2 is provided with a single supply pipe and/or a single return pipe.

The multichannel connection member 11 is connected firstly to a general feed duct 12, which is itself connected via a pump 14 to a bottom branch of a cross-shaped coupling. The pump 14 is a positive displacement pump. The pump is a pump having an asynchronous motor or a pump having a brushless motor.

One of the side branches of the coupling is connected to a first feed vessel 3 via a first control valve 15 and the other of the side branches of the coupling is connected, in this example, to a second feed vessel 13 via a second control valve 16.

Each of the feed vessels 3 and 13 can thus be put selectively into communication with the general feed duct by controlling the two control valves 15 and 16.

Optionally, a first feed duct 17 for feeding air under pressure is also connected, via a control valve 20, to the top branch of the coupling and thus to the general feed duct 12. This first feed duct 17 for feeding air under pressure is thus connected to the general feed duct 12 upstream from the pump 14.

The installation includes a regulator circuit given overall reference 23 and including a general purge duct 24. The general purge duct 24 has a top segment 24.1 that is oriented so as to trap bubbles of air rising from the substance. Said top segment 24.1 is connected to the connection member 11 by a vertical segment 24.2 followed by a connection segment 24.3. In this example, the top segment 24.1 slopes very slightly relative to the horizontal towards the vertical segment 24.2, i.e. the end of the top segment 24.1 that is connected to the remainder of the regulator circuit is higher than the end of the top segment 24.1 that is connected to the vertical segment 24.2.

The top segment 24.1 is extended by a discharge duct 25 connected to a bottom branch of a T-coupling.

One of the side branches of the coupling is connected firstly to the top portion of the first vessel via a third control valve 26 and to the top portion of the second vessel via a fourth control valve 27 enabling the discharge duct 25 to be put into connection with both of the vessels.

The second side branch of the T-coupling is connected to a second feed duct 21 for feeding compressed air via a control valve 22, which second compressed air feed duct 21 is thus also connected to the discharge 25.

A substance presence sensor N1 is mounted on the general feed duct 12 in the vicinity of the connection member 11, downstream from the pump 14, in order to measure the presence of a quantity of substance in the general feed duct 12.

Two substance presence sensors N2 and N3 are mounted on the vertical segment 24.2 in order to measure the presence of respective quantities of substance in the general purge duct 24.

A substance presence sensor N4 is also mounted on the general feed duct 12 in the vicinity of the pump 14 and upstream therefrom, in order to measure the presence of a quantity of substance in the general feed duct 12.

A pressure sensor P1 is mounted in the regulator circuit 23 downstream from the control valve 22 and level with said control valve 22 in order to measure the pressure in the regulator circuit at the outlet from the second compressed air feed duct 21.

A pressure sensor P2 is mounted under the multichannel connection member 11 in order to measure the pressure in said multichannel connection member.

Figure 2:
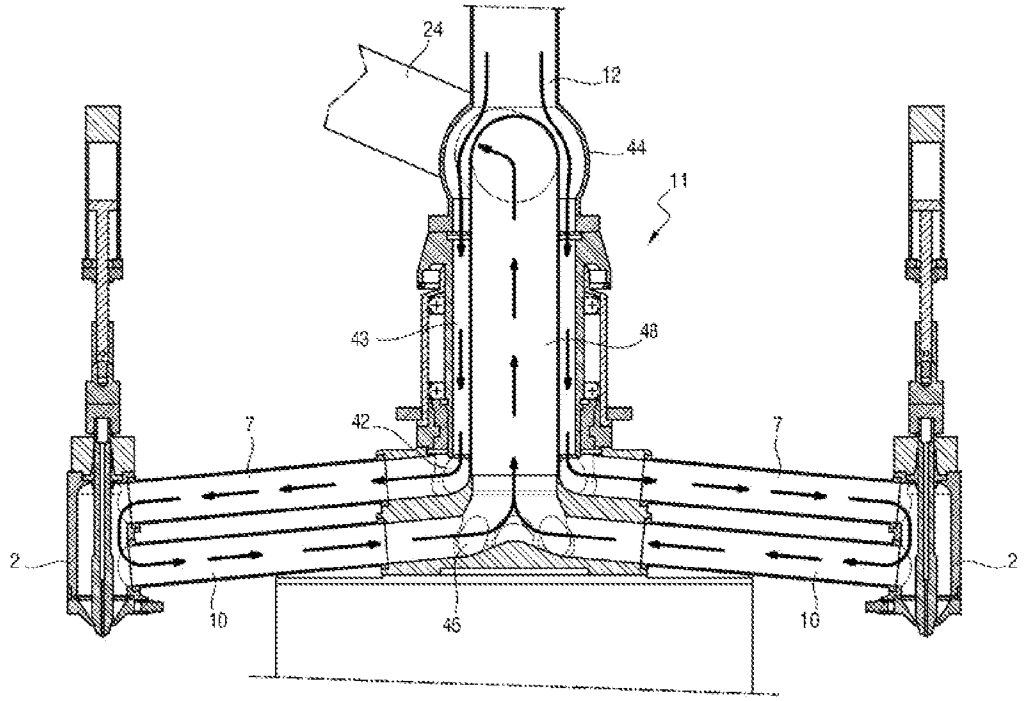
FIG. 2 is a diagrammatic axial section view on a vertical plane showing a connection member in the installation shown in FIG. 1.

With reference to FIG. 2, the multichannel connection member 11 comprises, in conventional manner, a first circular chamber 42 having connected thereto the supply pipes 7 for supplying the filler spouts 2 of the various filler stations in a regular distribution around an axis of symmetry of the multichannel connection member 11. Also in known manner, the first chamber 42 is connected by a first connection duct 43 to the general feed duct 12 via a rotary coupling 44.

The connection member also has a second chamber 45 concentric with the first chamber 42 and extending, in this example below the first chamber 42, and being separate therefrom. A second duct 48 extends coaxially inside the first duct 43. The bottom end of the second duct 48 opens out into the second chamber 45, and the top end of the second duct 48 is connected to the inside of the rotary coupling 44 so as to provide a connection with the coupling segment 24.3 of the general purge duct 24 in order to connect the second chamber 45 to the general purge duct 24.

The return pipes 10 of the various filler spouts 2 open out into the second chamber 45.

In the present example, each return pipe 10 extends in a straight line parallel to the direction in which the associated supply pipe 7 extends. Like the supply pipes 7, the return pipes 10 thus open out radially into the chamber under consideration.

In the present example, the return pipes 10 slope, like the supply pipes 7, between their high ends connected to the chamber under consideration in the multichannel connection member 11 and their low ends opening out into a respective one of the spouts 2.

The supply pipes 7 and the return pipes 10 are entirely independent of one another, such that the multichannel connection member 11 acts continuously for each filler station under consideration to connect in series the general feed duct 12, the supply pipe 7, the spout 2, the return pipe 10, and the general purge duct 24.

Thus, inside the multichannel connection member 11 and for each spout 2, there is no desired exchange of substance between the supply pipe 7 and the return pipe 10. The substance enters into the multichannel connection member 11 via the general feed duct 12 and flows in succession along the first connection duct 43 and along the supply pipes 7 in order to reach the spouts 2. Thereafter, the substance may potentially return via the return pipes 10 and then along the second connection duct 48 prior to reaching the general purge duct 24 outside the multichannel connection member 11.

Figure 3:
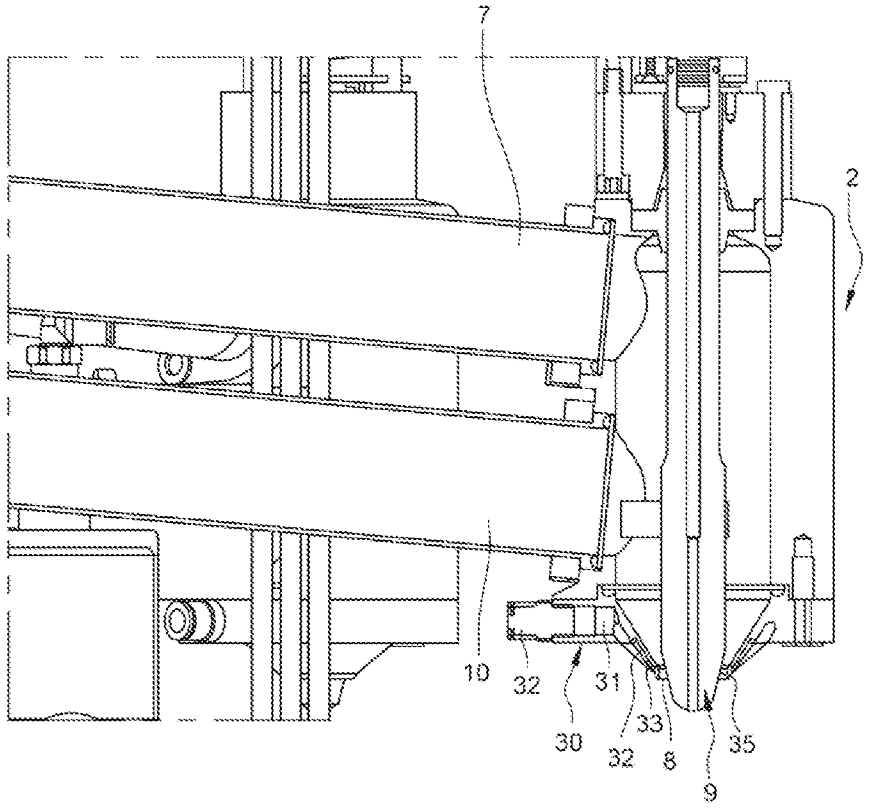
FIG. 3 is a view on a larger scale of a portion of the connection member shown in FIG. 2.

As can be seen in FIG. 3, each spout 2 is also provided at its bottom end with at least one suction channel 30. In this example, each spout 2 is provided with a single suction channel 30. It should be understood that the suction channel 30 is distinct from the return pipe 10 and also from the supply pipe 7.

Thus, each suction channel 30 extends between the outside of the spout body 6 and the inside of the spout body 6. More precisely, the suction channel 30 opens out at a first end to the outside of the installation 1 (and thus to the outside of the filler station) and at a second end to the inside of the spout body 6 above the orifice 8, with the suction channel 30 nevertheless extending entirely in the bottom end of the spout body 6.

The suction channel 30 has a connection segment 31 extending radially in the spout body 6 so as to open out at a first end to the outside of the spout body 6, of the filler station, and of the installation 1. In this example, the connection segment 31 extends substantially horizontally. Preferably, the suction channel 30 is also provided with a coupling 32 arranged in the first end of the connection segment 31.

At its second end, the connection segment 31 is extended by a distribution portion 33 that matches the shape of the end of the spout body 6. In the present example, the distribution portion 33 is frustoconical in shape such that the distribution portion 33 surrounds the delivery valve and thus the orifice 8 over 360°. Specifically, the connection segment 31 extends so as to open out into the top of the distribution portion 33.

The distribution portion 33 is extended by a junction portion 34 extending between the distribution portion 33 and the inside of the spout body 6. In the present example, the junction portion 34 is toroidal in shape such that the distribution portion 33 surrounds the delivery valve 9 and thus the orifice 8 over 360°. Specifically, the junction portion 34 extends so as to open out into the bottom of the distribution portion 33. The junction portion 34 extends substantially horizontally.

The suction channel 30 thus extends between the outside of the spout body 6 and the inside of the spout body 6 at the bottom end of the spout body 6 so as to open out inside the spout body 6 above the orifice 8. More precisely, the suction channel 30 opens out inside the spout body 6 immediately above the seat 35 of the delivery valve 9. In particular, in this example, the entire suction channel 30 extends in the bottom end of the spout 2, which end (in the shape of a truncated cone) is of section that is smaller than the remainder of the spout body 6 (which is cylindrical in shape).

There follows a description of the operation of the installation.

On starting, the installation is full of air. The delivery valves 9 are closed. All of the control valves are closed.

Starting from this position, the air contained in the installation is purged in order to prepare the installation for delivering the substance contained in the first feed vessel 3.

The control valves 15 and 26 are opened, and the pump 14 is activated so as to admit the substance under pressure from the first feed vessel 3 into the various ducts and pipes of the installation in order to purge them of the air that they contain, and this continues until the substance returns into the first feed vessel 3 via the discharge pipe.

The control unit controls the pump 14 on the basis of data transmitted by the various sensors (N1, N2, N3, N4, P1, and P2) and of a target filling rate at the spouts 2. For example, in order to stop admitting the substance under pressure into the general feed duct 12, the control unit can control the pump 14 so as to stop admitting substance under pressure into the general feed duct 12 once a determined time delay has elapsed from the moment when the sensor N3 detects that the substance has reached and gone past the level of the sensor.

In order to prepare the installation for delivering substance, the control valve 22 is then opened to cause air under pressure to penetrate into the regulator circuit 23 and the pump 14 is also controlled so as to allow substance to rise into the first feed vessel 3, should that be necessary. The delivery valves 9 are still closed.

The level of substance in the regulator circuit 23 is thus lowered progressively to reach the quantity of substance that is needed for packaging substance while allowing regulation. A portion of the regulator circuit 23 is thus purged of the substance.

Typically, the control unit controls the pump 14 as a function of the data transmitted by the pressure sensors P1 and P2 and by the presence sensors N1, N2, N3, and N4 so as to reach the target quantity of substance in the regulator circuit 23 and so as to reach the target filling rate via the spouts 2. Specifically, the quantity of substance in the regulator circuit 23 makes it possible to vary the delivery rate via the spouts 2.

By way of example, the pump 14 is controlled so that the substance goes back down to the level of the sensor N2. The level of substance in the installation then corresponds at least to the total volume of the filler spout bodies 6 and of the feed ducts 7 of the filler spouts.

Production can then begin. It should be observed that the above-described preparation of the installation advantageously does not involve any substance being rejected.

During a production stage, the pump 14 is activated to admit the substance under pressure from the first feed vessel 3 into the general feed duct 12 and thus into the various supply pipes 7 and the spouts 2.

The configuration with a general feed duct 12 in series with the regulator circuit 23 (and in particular with the general purge duct 24) containing air provides the advantage of significantly improving the accuracy of metering, in particular when making use of weighing technology. Specifically, the presence of air in the general purge duct 24 serves to absorb pressure variations associated with opening and closing the spouts 2, thereby making it possible to have a metering rate that is relatively stable.

While the substance is being packaged in the containers, the flow rate in the supply pipes 7 of the spouts 2 is controlled by the pump, with adjustment being possible by acting on the pressure of air in the top segment 24.1 of the general purge duct 24. Specifically, variation of the total flow rate in the supply pipes 7 can be compensated by varying the level of substance in the vertical segment 24.2 of the general purge duct 24 so that the flow rate is substantially constant in each of the feed ducts 7 of the spouts 2.

The control unit controls the pump 14 as a function of the data transmitted by the pressure sensors P1 and P2 and by the presence sensors N1, N2, N3, and N4 and also as a function of the filling rate via the spouts 2 so as to maintain the target quantity of substance in the regulator circuit 23. In this example, the filling rate via the spouts 2 corresponds to the instantaneous filling rate via each spout divided by the number of spouts that are open.

It should be observed that the spouts 2 are used not only for filling the containers, but also for connecting the supply pipes 7 in series with the return pipes 10 in order to maintain the target quantity of substance in the regulator circuit 23.

If the vessel 3 is empty, it is possible to open the control valve 20 in order to maintain sufficient pressure in the installation for delivering substance.

When it is desired to change substance, the control valve 15 is closed and the substance that remains in the installation is drained. The draining step (which is described below) is also applied in the event that the sensor N4 detects a lack of substance at its level, indicating that the first feed vessel 3 is empty. In this event, it is then essential to close the control valve 15.

For draining purposes, the containers continue to be filled as during the production stage until the level of substance drops below the level of the sensors N1 and N2 and then flows out from the multichannel connection member 11 and the supply and return pipes 7 and 10 as a result of these pipes being connected together in series at the spouts 2. The spouts 2 are thus fed with substance both via the supply pipes 7 and via the return pipes 10.

At this stage it is also possible to open the control valve 20 in order to maintain sufficient pressure in the installation for delivering substance.

Figure 4:
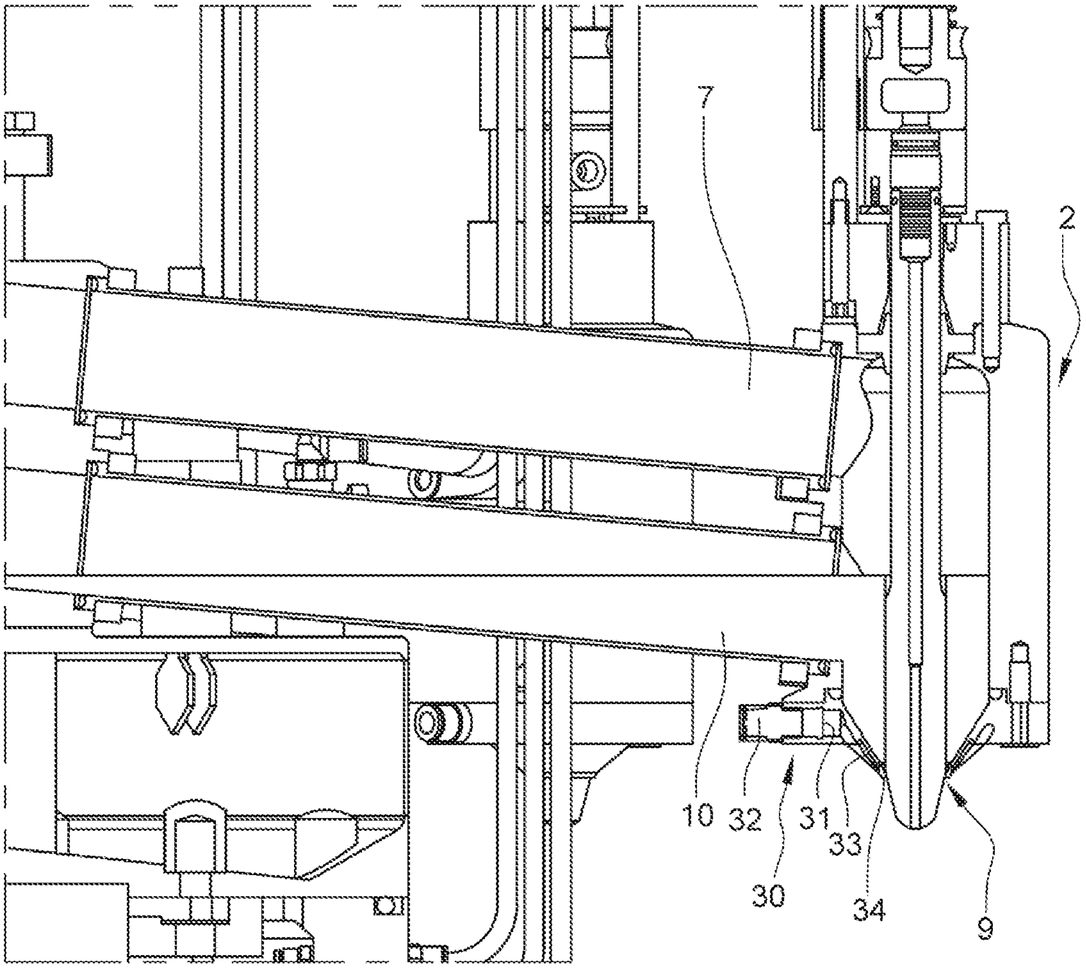
FIG. 4 is a view similar to the view of FIG. 3, with the substance still being present in the control station of the installation shown in FIG. 1, the delivery valve of said station being closed.

In the end, and as can be seen more clearly in FIG. 4, only a small quantity of substance might possibly remain present in the low portions of the spout bodies 6 situated above the delivery valves 9 and in the low portions of the corresponding return pipes 10.

The control valves 15, 26, and 22 (and possibly also 20) are then closed, and the pump 14 is stopped. The various delivery valves 9 are closed.

This residual quantity of substance is then sucked out, advantageously making use of the suction channel 30. For this purpose, suction means are coupled to the coupling 32 of said suction channel 30 prior to activating said means in order to suck out the residual substance while keeping the delivery valves 9 closed. The substance as sucked out in this way passes in succession through the junction portion 34, the distribution portion 33, and the connection segment 31, prior to leaving the spout body 6, the filler station, and the installation 1. Once the substance has been sucked out, the suction means are separated from the installation 1.

The substance that has been sucked out may then be discarded or it may be sold in a degraded form, e.g. by being diluted. There is thus only a very small loss of substance associated with this process of changing feed vessel.

Once the substance coming from the first feed vessel 3 has been drained, the installation is prepared for delivering the substance coming from the second feed vessel 13.

For this purpose, during a first step, the installation is purged once more of the air that it contains, and then during a second step the level of substance in the regulator circuit 23 is lowered to reach the quantity of substance that is necessary for packaging the substance while making regulation possible. These two steps are identical to those described above with reference to the first feed vessel 3, except that it is the control valves 16 and 27 that are controlled and not the control valves 15 and 26.

In the same manner as for the first feed vessel 3, during the production stage, the pump 14 is activated to admit the substance under pressure from the second feed vessel 13 into the general feed duct 12 and thus into the various supply pipes 7 and the spouts 2.

When it is desired to change substance, or when the second feed vessel 13 is empty, the installation is drained in the same manner as described above for the first feed vessel 3.

In the end, only a small quantity of substance might possibly remain present in the low portions of the spout bodies 6 situated above the delivery valves 9 and in the low portions of the corresponding return pipes 10.

All of the control valves are then closed, and the pump 14 is stopped. This residual quantity of substance is then sucked out via the suction pipes, in the manner described above.

A new production cycle can then begin.

It is thus possible in very simple manner to change substance between two production cycles, and to do so without needing to have recourse to the large-sized collectors of the prior art.

In this first embodiment, there is no cleaning operation (i.e. washing and/or rinsing). By way of example, this is possible when the substances for packaging are oils such as mineral oils.

Figure 5:
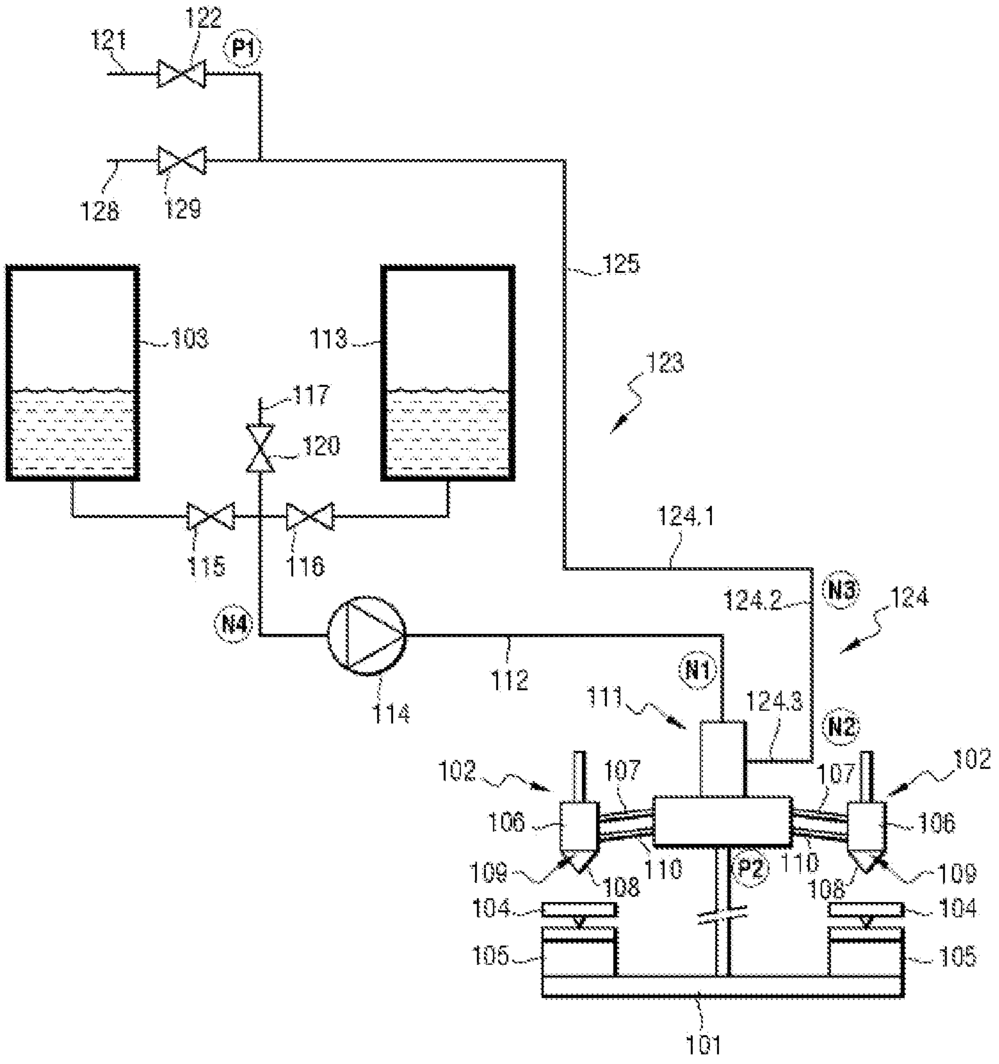
FIG. 5 is a diagrammatic overall view of a device in a second embodiment of the invention.

With reference to FIG. 5, and in a second embodiment, the installation is configured to enable the installation to be cleaned (washed and/or rinsed) between two production cycles. By way of example, this can be advantageous when the substance is a detergent, a cosmetic, . . . .

In reality, the installation in this example is identical to the installation in the first embodiment, except that the discharge duct 125 is not connected to the feed vessels 103 and 113. In this example, the discharge duct 125 is connected firstly to the second pressurized air feed duct 121 via the control valve 122 and also to an effluent outlet duct 128 via a control valve 129.

The remainder of the installation is identical to the installation of the first embodiment. In particular, in this example, the multichannel connection member 111 is identical to the same member in the first embodiment.

There follows a description of the operation of the installation.

On starting, the installation is full of air. All of the control valves are closed. The delivery valves 109 are closed.

Starting from this position, the air contained in the installation is purged in order to prepare the installation for delivering the substance contained in the first feed vessel 103.

The control valves 115 and 129 are opened, and the pump 114 is activated so as to admit the substance under pressure from the first feed vessel 103 into the various ducts and pipes of the installation in order to purge them of the air that they contain, and this continues until the substance is discharged into the effluent outlet duct 128.

On the basis of data transmitted by the various sensors (N1, N2, N3, N4, P1, and P2) the control unit controls the pump 114 and a target filling rate at the spouts 102. For example, in order to stop admitting the substance under pressure into the general feed duct 112, the control unit can control the pump 114 so as to stop admitting substance under pressure into the general feed duct 112 once a determined time delay has elapsed from the moment when the sensor N3 detects that the substance has reached and gone past the level of the sensor.

In order to prepare the installation for delivering substance, the control valve 129 is then closed and the control valve 122 is then opened to cause air under pressure to penetrate into the regulator circuit 123 and the pump 114 is also controlled so as to allow substance to rise into the first feed vessel 103, should that be necessary. The delivery valves 109 are still closed.

The level of substance in the regulator circuit 123 is thus lowered progressively to reach the quantity of substance that is needed for packaging substance while allowing regulation. The regulator circuit 123 is thus purged in part of the substance.

Typically, the control unit controls the pump 114 as a function of the data transmitted by the pressure sensors P1 and P2 and by the presence sensors N1, N2, N3, and N4 so as to reach the target quantity of substance in the regulator circuit 123 and so as to reach the target filling rate via the spouts 102. Specifically, the quantity of substance in the regulator circuit 123 makes it possible to vary the delivery rate via the spouts 102.

By way of example, the pump 114 is controlled so that the substance goes back down to the level of the sensor N2. The level of substance in the installation then corresponds at least to the total volume of the filler spout bodies 106 and of the feed ducts 107 of the filler spouts.

Production can then begin. It should be observed that the above-described preparation of the installation advantageously does not involve a large amount of substance being rejected.

During a stage of production, the pump 114 is activated to admit the substance under pressure from the first feed vessel 103 into the general feed duct 112 and thus into the various supply pipes 107 and the spouts 102.

The configuration with a general feed duct 112 in series with the regulator circuit 123 (and in particular with the general purge duct 124) containing air provides the advantage of significantly improving the accuracy of metering, in particular when making use of weighing technology. Specifically, the presence of air in the general purge duct 124 serves to absorb pressure variations associated with opening and closing the spouts 102, thereby making it possible to have a metering rate that is relatively stable.

While the substance is being packaged in the containers, the flow rate in the supply pipes 107 of the spouts 102 is controlled by the pump, with adjustment being possible by acting on the pressure of air in the top segment 124.1 of the general purge duct 124. Specifically, variation of the total flow rate in the supply pipes 107 is can be compensated by varying the level of substance in the vertical segment 124.2 of the general purge duct 124 so that the flow rate is substantially constant in each of the feed ducts 107 of the spouts 102.

The control unit controls the pump 114 as a function of the data transmitted by the pressure sensors P1 and P2 and by the presence sensors N1, N2, N3, and N4 and also as a function of the filling rate via the spouts 102 so as to maintain the target quantity of substance in the regulator circuit 123. In this example, the filling rate via the spouts 102 corresponds to the instantaneous filling rate via each spout divided by the number of spouts that are open.

It should be observed that the spouts 102 are used not only for filling the containers, but also for connecting the supply pipes 107 in series with the return pipes 110 in order to maintain the target quantity of substance in the regulator circuit 123.

If the vessel 103 is empty, it is possible to open the control valve 120 in order to maintain sufficient pressure in the installation for delivering substance.

When it is desired to change substance, the control valve 115 is closed and the substance that remains in the installation is drained. The draining step (which is described below) is also applied in the event that the sensor N4 detects a lack of substance at its level, indicating that the first feed vessel 103 is empty. In this event, it is then essential to close the control valve 115.

For draining purposes, the containers continue to be filled as during the production stage until the level of substance drops below the level of the sensors N1 and N2 and then flows out from the multichannel connection member 111 and the supply and return pipes 107 and 110 as a result of these pipes being connected together in series at the spouts 102. The spouts 102 are thus fed with substance both via the supply pipes 107 and via the return pipes 110.

At this stage it is also possible to open the control valve 20 in order to maintain sufficient pressure in the installation for delivering substance.

In the end, only a small quantity of substance might possibly remain present in the low portions of the spout bodies 106 situated above the delivery valves 109 and in the low portions of the corresponding return pipes 110.

The control valves 115 and 122 (and possibly also 120) are then closed, and the pump 114 is stopped.

The installation is then cleaned, which in this example consists in rinsing it, the second feed vessel 113 containing water for this purpose.

The control valves 116 and 129 are opened, and the pump 114 is activated so as to admit water under pressure from the second feed vessel 113 into the various ducts and pipes of the installation until water is discharged into the effluent outlet duct 128.

The control unit then controls the pump 114 to stop admitting water under pressure into the general feed duct 112. The control valve 116 is closed identically.

Cleaning is then performed by putting a collector under the spouts 2 and then opening the control valves 120 and 122 in order to cause air under pressure to penetrate respectively into the general feed duct 120 and into the regulator circuit 123 so as to empty the water from the circuit of the installation and dry it, the delivery valves 9 of the spouts 2 naturally being open during this operation.

The collector may optionally also be used for cleaning the bottom portions of the spouts 2.

The installation is then ready to package a new substance brought in, in conventional manner, from a feed vessel connected in parallel with the pump 114 by means of control valves that are suitable for avoiding communication between the feed vessels, as described above with reference to the first embodiment.

For both embodiments, an installation is described that serves to limit losses of substance while maintaining quality for each production cycle. In particular, the installation can control the dilution of substance coating the various ducts and pipes at the end of each production cycle.

Also, production cycle changeover can be fully automated: this reduces non-production time and limits human intervention.

The installation also makes it possible to perform packaging from at least two distinct feed vessels, even if they are far apart from each other (sometimes several tens of meters apart).

Naturally, the invention is not limited to the embodiments described above, and variant embodiments may be provided without going beyond the ambit of the invention as defined by the claims.

In particular, although the installation is described with reference to metering by weighing with containers being supported by their bottoms, the invention applies equally to filler spouts associated with containers being supported by their necks and/or with metering by flow rate.

Although the invention enables a series of filler spouts to be fed simultaneously, the invention could be arranged to feed a single filler spout associated with a set of simple control valves associated with a network of ducts that are suitably interconnected.

The number of vessels in the installation could be greater than that described, and for example the installation could have four feed vessels, at least five feed vessels, or at least six feed vessels.

Although above, the installation has at least one pressure sensor under the connection member, the pressure sensor could be arranged level with one of the presence sensors N1 or N2.

Although a time period is determined from the moment when the sensor N3 detects that the substance has reached and gone past its level, said moment could be determined from information about the flow rate through the pump, about the number of revolutions per minute of the associated motor, . . . .

Although above, the supply pipe opens out above the return pipe in the spout, the multichannel connection member could be shaped so that the return pipe opens out above the supply pipe. In addition, or as an alternative, the return pipes could be arranged above the supply pipes in the installation (relative to the in-service position of said installation).

Furthermore, it would be possible to reverse of the flow direction of substance through the connection member 11. The filler stations could thus be supplied via the duct 24 and purged via the duct 12. It would then be the feed duct that is arranged inside the purge duct within the multichannel connection member.

The spout need not be provided with a suction channel extending in the bottom end of the spout body between the outside of the filler station and the inside of the spout body so as to open out inside the spout body above the orifice. Under such circumstances, a collector would be used to perform substance-changing stages.

The installation could include at least one circuit for facilitating degassing of the installation, and in particular a secondary purge circuit, e.g. arranged in parallel with the general purge duct.

Although above, the installation operates with compressed air, the installation could operate with air at atmospheric pressure, particularly, although not exclusively, for substances that are not very viscous and/or for low production rates. Preferably, although not exclusively, the installation is designed to operate with compressed air for substances that are viscous and/or for large production rates. Naturally, the two embodiments described could be combined in such a manner that the installation has both a connection to an effluent outlet duct and a connection opening out into the top portion of at least one vessel. The installation could thus have at least two distinct substance feed vessels and a vessel containing a cleaning substance (e.g. water or a cleaning chemical).

The invention claimed is:

1. An installation for packaging a substance in containers, the installation including:

at least one filler station comprising a filler spout having a spout body with a bottom end provided with an orifice fitted with a controlled delivery valve; and a multichannel connection member connected firstly to a feed duct and secondly to a purge duct for connecting these ducts to the spout, the multichannel connection member comprising for this purpose both a filler spout supply pipe opening out into the spout body above the delivery valve and connected to the feed duct, and also a return pipe opening out into the spout body above the delivery valve and connected to the purge duct, the supply pipe and the return pipe being entirely independent of each other, such that the multichannel connection member acts continuously to connect in series the feed duct, the supply pipe, the filler spout, the return pipe, and the purge duct.

2. The installation according to claim 1, wherein the multichannel connection member includes:

a first duct connected to the general feed duct and opening out into a first chamber to which the supply pipe of the filler spout is connected; and a second duct connected to the purge duct and opening out into a second chamber separate from the first chamber and having the return pipe of the filler spout connected thereto, wherein the second duct extends coaxially with the first duct.

3. The installation according to claim 2, wherein the second duct extends inside the first duct.

4. The installation according to claim 2, wherein the second chamber extends below the first chamber.

5. The installation according to claim 1, wherein the supply pipe extends parallel to the return pipe.

6. The installation according to claim 1, wherein at least one of the supply and return pipes extends in a straight line.

7. The installation according to claim 1, wherein the return pipe extends below the supply pipe.

8. The installation according to claim 1, wherein at least one of the supply and return pipes slopes between its high end connected to the multichannel connection member and its low end opening out into the spout.

9. The installation according to claim 1, further comprising a pump for admitting substance under pressure into the feed duct, the pump being controlled at least as a function of a quantity of substance present in the purge duct and of a delivery flow rate at the filler spout.

10. The installation according to claim 1, further comprising a plurality of filler stations with filler spout supply pipes and return pipes connected to the multichannel connection member.

11. The installation according to claim 10, wherein the filler spout supply pipes and the return pipes are regularly distributed around an axis of symmetry of the multichannel connection member.

12. The installation according to claim 1, further comprising at least one effluent outlet duct connected to the purge duct.

13. The installation according to claim 1, further comprising at least one feed vessel having a low portion connection to the feed duct and a high portion connection to the purge duct.

14. The installation according to claim 1, further comprising a plurality of feed vessels each having a respective low portion connection to the feed duct and a high portion connection to the purge duct.

15. The installation according to claim 1, wherein the installation is devoid of a filling vessel.

16. The installation according to claim 1, wherein the filler spout is positioned vertically above the containers without contacting the containers.

17. The installation according to claim 1, wherein the filler spout is offset from the containers.

18. The installation according to claim 1, wherein, inside the multichannel connection member, there is no exchange of the substance between the supply pipe and the return pipe.

19. An installation for packaging a substance in a plurality of containers, the installation comprising:

a plurality of filler stations each comprising a filler spout having a spout body with a bottom end provided with an orifice fitted with a controlled delivery valve; and a multichannel connection member connected firstly to a feed duct and secondly to a purge duct for connecting these ducts to the filler spouts, the multichannel connection member comprising:

a filler spout supply pipe opening out into the spout body above the delivery valve and connected to the feed duct; and a return pipe opening out into the spout body above the delivery valve and connected to the purge duct, the supply pipe and the return pipe being entirely independent of each other, such that the multichannel connection member acts continuously to connect in series the feed duct, the supply pipe, the filler spouts, the return pipe, and the purge duct.

* * * * *